(12) United States Patent
Zhang et al.

(10) Patent No.: US 11,339,074 B2
(45) Date of Patent: May 24, 2022

(54) HIGHLY EFFECTIVE IN SITU TREATMENT METHOD FOR ENDOGENOUS POLLUTION IN SLUDGE

(71) Applicant: Nanjing Institute of Environmental Sciences, Ministry of Ecology and Environment, Nanjing (CN)

(72) Inventors: Yimin Zhang, Nanjing (CN); Ming Kong, Nanjing (CN); Longmian Wang, Nanjing (CN); Ruihua Meng, Nanjing (CN); Yuexiang Gao, Nanjing (CN); Jianying Chao, Nanjing (CN); Fei Yang, Nanjing (CN); Fuquan Peng, Nanjing (CN); Yueming Zhu, Nanjing (CN)

(73) Assignee: Nanjing institute of Environmental Sciences, Ministry of Ecology and Environment, Nanjing (CN)

( * ) Notice: Subject to any disclaimer, the term of this patent is extended or adjusted under 35 U.S.C. 154(b) by 86 days.

(21) Appl. No.: 16/767,239

(22) PCT Filed: Apr. 27, 2018

(86) PCT No.: PCT/CN2018/084757
§ 371 (c)(1),
(2) Date: May 27, 2020

(87) PCT Pub. No.: WO2019/104941
PCT Pub. Date: Jun. 6, 2019

(65) Prior Publication Data
US 2020/0407256 A1    Dec. 31, 2020

(30) Foreign Application Priority Data
Nov. 29, 2017    (CN) .......................... 201711229893.7

(51) Int. Cl.
*C02F 11/06* (2006.01)
*C02F 11/00* (2006.01)
(Continued)

(52) U.S. Cl.
CPC ............ *C02F 11/06* (2013.01); *C02F 11/004* (2013.01); *C02F 2101/105* (2013.01);
(Continued)

(58) Field of Classification Search
CPC .. C02F 11/06; C02F 11/004; C02F 2101/105; C02F 2101/16; C02F 2101/30;
(Continued)

(56) References Cited

U.S. PATENT DOCUMENTS 6,878,284 B2 * 4/2005 Hasegawa ................ B01J 20/18
210/660
7,704,399 B2 * 4/2010 Condit ..................... C02F 1/725
210/666
(Continued)

FOREIGN PATENT DOCUMENTS

CN       101698528 A       4/2010
CN       103708694 A       4/2014
(Continued)

OTHER PUBLICATIONS

CN105859066A-Zhou-translated (supplemental copy) (Year: 2016).*

*Primary Examiner* — Nam X Nguyen
*Assistant Examiner* — Ekandra S. Miller-Cruz
(74) *Attorney, Agent, or Firm* — Zhihua Han; Wen IP LLC

(57) ABSTRACT

The present invention discloses a highly effective in situ treatment method for endogenous pollution in sludge, belonging to the field of environmental engineering water treatment. In view of the problem that it is difficult to effectively treat the endogenous pollution of river sludge, the (Continued)

present invention provides the highly effective in situ treatment method for endogenous pollution in sludge, which specifically adopts a combination of phoslock, calcium peroxide and aluminum modified zeolite to perform in-situ remediation of sludge, effectively inhibit the release of endogenous pollution of sludge, facilitate the ecological treatment of polluted water subsequently, and finally realize the long-term water improvement against pollution.

11 Claims, 2 Drawing Sheets

(51) Int. Cl.
    *C02F 101/10*    (2006.01)
    *C02F 101/16*    (2006.01)
    *C02F 103/00*    (2006.01)
    *C02F 101/30*    (2006.01)

(52) U.S. Cl.
    CPC ...... *C02F 2101/16* (2013.01); *C02F 2101/30* (2013.01); *C02F 2103/007* (2013.01); *C02F 2209/08* (2013.01); *C02F 2209/14* (2013.01); *C02F 2209/18* (2013.01)

(58) Field of Classification Search
CPC ............ C02F 2103/007; C02F 2209/08; C02F 2209/14; C02F 2209/18; C02F 1/281; C02F 11/00; C02F 1/722; C02F 2209/22; C02F 2303/02
USPC .......................................................... 210/739
See application file for complete search history.

(56) References Cited

U.S. PATENT DOCUMENTS

| 7,758,752 B2* | 7/2010 | Pan | C02F 1/288 |
| | | | 210/602 |
| 2009/0069181 A1* | 3/2009 | Boulos | C02F 1/722 |
| | | | 504/151 |

FOREIGN PATENT DOCUMENTS

| CN | 104876639 A | 9/2015 |
| CN | 105749892 A | 7/2016 |
| CN | 105859066 A | 8/2016 |
| CN | 107262024 A | 10/2017 |
| CN | 107759040 A | 3/2018 |
| JP | S6427686 A | 1/1989 |
| WO | WO2008096988 A1 | 8/2008 |

* cited by examiner

HIGHLY EFFECTIVE IN SITU TREATMENT METHOD FOR ENDOGENOUS POLLUTION IN SLUDGE

TECHNICAL FIELD

The present invention relates to the field of environmental engineering water treatment, and in particular, to a highly effective in situ treatment method for endogenous pollution in sludge.

BACKGROUND

Nowadays, with the development of economy and society, the pollution problem is becoming more and more serious. For example, urban black and odorous rivers, lake water eutrophication, water algae outbreak and other problems have aroused widespread concern in society. One of the major reasons for the water quality failing to meet the standard is the endogenous pollution of sludge. A dredging project, as a method for effectively removing silt from the bottom of the water body, is widely used in a water pollution control process. However, the early urban construction lacked planning and did not leave space for both sides of the urban rivers, making it difficult to implement dredging projects on both sides of the black and odorous rivers. Moreover, the lake has a large volume of water, which makes it difficult to implement dry dredging; and due to the large surface area of the lake, it is difficult to apply a wet dredging project. Under the circumstances listed above, it is difficult to implement the ex-situ treatment technology for endogenous pollution of sludge, so in-situ treatment for endogenous pollution of sludge is performed.

In many literatures, the feasibility of in-situ treatment for endogenous pollution of sludge has been studied in detail. Some literatures have showed that adding calcium peroxide can effectively improve dissolved oxygen in water with endogenous pollution and inhibit the release of phosphate radical in sludge. Zeolite combined with calcium peroxide can effectively reduce ammonia nitrogen content of the water body, but this method has a limited adsorption effect and short duration.

According to retrieval, a patent with a patent number ZL201410839564.4 and a publication number CN 104591512A discloses a process for in-situ remediation of sediment pollution by enzyme and bacteria preparations. The patent content is as follows: an ecological carrier is arranged, and an enzyme preparation and a bacteria preparation are distributed or added into the carrier in multiple layers. The enzyme preparation enables pollutants in the sediment to undergo chemical reactions through catalysis to change their components, and the bacterial preparation expedites the generation of various microorganisms, thereby causing the water quality to quickly reach the standard, and enabling the treated water to be continuously self-checked and keep clean. However, the implementation environment of this method is demanding, requiring the sludge environment to be suitable for the growth of molds.

According to the retrieval performed again, a patent with a patent number ZL201210162877.1 and a publication number CN102674646A discloses a method for in-situ remediation of sediment polluting surface water. Its patent content includes: injecting a nitrate solution into sediment to remove organic pollutants in the sediment and inhibit release of phosphorus in the sediment by using the nitrate, and adding an active covering material to a sediment-water interface to form an active covering layer system, thereby controlling ammonia nitrogen released from the sediment by using the formed active covering layer system, and preventing nitrate in pore water from migrating to overlying water to prevent nitrate pollution in the overlying water. However, this method has strict construction requirements and is difficult to implement in large-scale projects. It is only suitable for small tests.

SUMMARY

1. Problems to be Solved

In view of the problems that it is difficult to implement construction in existing black and odorous rivers and the conventional technology for in-situ treatment for endogenous pollution of sludge only aims at a water quality index of a single pollutant, the present invention provides a highly effective in situ treatment method for endogenous pollution in sludge, which applies a combination of chemicals to a black and odorous river to remove various pollutants in the water with endogenous pollution so as to achieve the effect of effectively treating endogenous pollution of sludge.

2. Technical Solution

In order to solve the foregoing problems, the present invention adopts the following technical solution:

a highly effective in situ treatment method for endogenous pollution in sludge, including the following steps:

(1) adding water to suspend phoslock to obtain wet dosing phoslock; drying calcium peroxide to obtain dry dosing calcium peroxide; drying aluminum modified zeolite to prepare dry dosing aluminum modified zeolite, where the phoslock is a product of Phoslock Water Solutions in Australia; experiments show that suspending the phoslock in water in advance has a better effect than directly putting the phoslock into the surface of a water with endogenous pollution, and this avoids the situation that directly putting the phoslock into the surface of the water with endogenous pollution causes some organic pollutants to be directly wrapped on the surface of the phoslock, making it difficult for the phoslock to function. In addition, in order that the calcium peroxide and the aluminum modified zeolite exert better performance, their dryness needs to be ensured before dosing;

(2) adding the wet dosing phoslock and the dry dosing calcium peroxide obtained in step (1) to the surface of the water with endogenous pollution for natural settling, where the adding amount of the wet dosing phoslock is 1 kg of phoslock per 10.5 g $PO_4^{3-}$—P in the water with endogenous pollution, and the value of the adding amount of the dry dosing calcium peroxide in grams is 0.01% that of the weight of the water with endogenous pollution in kilograms; when the transparency of the water with endogenous pollution is improved by 20%-30% compared with the transparency obtained before wet dosing, evenly adding the dry dosing aluminum modified zeolite obtained in step (1), where the value of the adding amount of the dry dosing aluminum modified zeolite in grams is 100 times that of the ammonia nitrogen concentration in milligrams per liter; in this step, the phoslock is added first and then the calcium peroxide and the aluminum modified zeolite are added, and the reasonable dosage relation between the three chemicals is controlled, which facilitates the removal of various pollutants in water;

(3) monitoring the water quality of the water with endogenous pollution every three days and comparing it with the water quality of the water with endogenous pollution in the previous monitoring, and determining the adding amounts for the next time according to the comparison result, where the adding amounts for the next time are controlled by:

when all indexes of the water quality of the monitored water with endogenous pollution do not meet the Class V water standard in China national standard GB3838-2002, implementing step (2); and continuing to monitor the water quality of the water with endogenous pollution until all indexes of the water quality meet the Class V water standard in China national standard GB3838-2002.

Preferably, the solid-liquid ratio of the phoslock to water in the wet dosing phoslock is 0.8-1.2 g/mL; when the solid-liquid ratio is within this range, a better treatment effect can be realized, and the phosphate adsorption capacity is 9.5-10.5 g $PO_4^{3-}$—P/kg.

Preferably, the solid-liquid ratio of the phoslock to water in the wet dosing phoslock is 1.0 g/mL; and in this case, the phoslock has the best treatment effect, with a phosphate adsorption capacity of 10.5 g $PO_4^{3-}$—P/kg.

Preferably, the adding amounts for the next time in step (3) are further controlled by: when in the monitored water with endogenous pollution, COD exceeds 40 mg/L and the index of ammonia nitrogen and the index of total phosphorus are within the standard limit of ammonia nitrogen and the standard limit of total phosphorus in the Class V water standard in China national standard GB3838-2002 respectively, continuing to add the dry dosing calcium peroxide, where the adding amount of the dry dosing calcium peroxide is 1.5 times that of the dry dosing calcium peroxide in step (2), while the adding amount of the wet dosing phoslock and the adding amount of the dry dosing aluminum modified zeolite are 0.8 time that of the wet dosing phoslock and 0.8 time that of the dry dosing aluminum modified zeolite in step (2), respectively.

Preferably, the adding amounts for the next time in step (3) are further controlled by: when in the monitored water with endogenous pollution, the concentration of total phosphorus exceeds 0.4 mg/L and the index of COD and the index of ammonia nitrogen are within the standard limit of COD and the standard limit of ammonia nitrogen in the Class V water standard in China national standard GB3838-2002 respectively, continuing to add the wet dosing phoslock, where the adding amount of the wet dosing phoslock is 1.5 times that of the wet dosing phoslock in step (2), while the adding amount of the dry dosing calcium peroxide and the adding amount of the dry dosing aluminum modified zeolite are 0.8 time that of the dry dosing calcium peroxide and 0.8 time that of the dry dosing aluminum modified zeolite in step (2), respectively.

Preferably, the adding amounts for the next time in step (3) are further controlled by: when in the monitored water with endogenous pollution, the concentration of total nitrogen exceeds 2 mg/L and the index of COD and the index of total phosphorus are within the standard limit of COD and the standard limit of total phosphorus in the Class V water standard in China national standard GB3838-2002 respectively, continuing to add the dry dosing aluminum modified zeolite, where the adding amount of the dry dosing aluminum modified zeolite is 1.5 times that of the dry dosing aluminum modified zeolite in step (2), while the adding amount of the wet dosing phoslock and the adding amount of the dry dosing calcium peroxide are 0.8 time that of the wet dosing phoslock and 0.8 time that of the dry dosing calcium peroxide in step (2), respectively.

Preferably, a method for preparing the aluminum modified zeolite in step (2) includes: preparing 1 mol/L aluminum sulfate solution and 1 mol/L sodium hydroxide solution respectively, adding 1 g of solid zeolite to every 10 mL of mixed solution of aluminum sulfate and sodium hydroxide, and then transferring to a water bath at 80° C. for heating and stirring treatment to obtain the aluminum modified zeolite; and the adsorption capacity of the aluminum modified zeolite to ammonia nitrogen pollutants is 8-10 mg/g.

Preferably, the ratio of the volume of the aluminum sulfate solution to the volume of the sodium hydroxide solution in the mixed solution of aluminum sulfate and sodium hydroxide is 1:1; in this case, the adsorption capacity of the aluminum modified zeolite is the best, and the adsorption capacity of the aluminum modified zeolite to ammonia nitrogen pollutants reaches 10 mg/g.

3. Beneficial Effects

Compared with the prior art, the present invention has the following beneficial effects:

(1) The highly effective in situ treatment method for endogenous pollution in sludge in the present invention is subjected to fewer restrictions in the process of engineering implementation, is economical compared with a physical dredging method, and can be implemented only by adding a combination of phoslock, calcium peroxide and aluminum modified zeolite; in addition, the reasonable setting of the solid-liquid ratio in the wet dosing phoslock is conducive to the full suspension of the phoslock.

(2) The highly effective in situ treatment method for endogenous pollution in sludge in the present invention not only is effective for a single water pollution index, but also has a significant reduction effect on COD value, DO value, ammonia nitrogen concentration and total phosphorus concentration (the removal rate can reach 90% or above), and achieves a comprehensive treatment effect to prevent water quality from deteriorating at a later stage.

(3) The chemical combination mode in the present invention has no secondary pollution and facilitates the establishment of a later ecological landscape; in addition, the chemicals are added by combining wet dosing and dry dosing and are added in sequence, which maximizes the chemical efficacy of inhibiting endogenous pollution.

(4) The phoslock in the chemical combination of the present invention is lanthanum modified clay, which can make phosphate settle in the water with endogenous pollution to cover the sludge in water with endogenous pollution, thereby reducing endogenous phosphorus release amount of sludge. Calcium peroxide is an oxide, which can effectively improve the reducing environment of sludge water interfaces such as anaerobic water, effectively slow down the release of organic matters and other reducing pollutants in sludge, and form calcium hydroxyphosphate precipitation with phosphate in the water with endogenous pollution; the aluminum modified zeolite is used as a material capable of effectively adsorbing nitrogen and phosphorus, and when the ratio of the volume of aluminum sulfate solution to the volume of sodium hydroxide solution is controlled to be 1:1 in the preparation method, the release of nitrogen and phosphorus pollutants in sludge can be effectively slowed down.

(5) In the present invention, when the concentration of calcium peroxide in the water with endogenous pollution is 0.01%, the ammonia nitrogen content can be effectively reduced by 36% or more, the dissolved oxygen content in the anaerobic water can be effectively increased, and bacterial proliferation can be inhibited; in addition, the phoslock has a phosphate adsorption capacity of 9.5-10.5 g $PO_4^{3-}$—P/kg, and the aluminum modified zeolite has an ammonia nitrogen pollutant adsorption capacity of 8-10 mg/g in the chemical combination, respectively.

DESCRIPTION OF EMBODIMENTS

Figure 1:
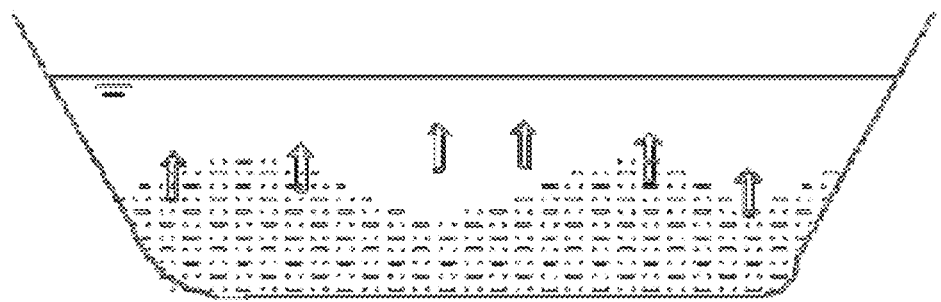
FIG. 1 is a schematic diagram of release of endogenous pollutants of sludge.

In order to make the technical means, creative features, goals and effects realized by the present invention easy to understand, the present invention is further illustrated by the following specific embodiments, but the protection scope of the present invention is not limited.

Embodiment 1

Water samples of a black and odorous river were collected from a city in Jiangsu, and through laboratory analysis, it was found that the water quality situation of the water samples of the black and odorous river was as follows: ammonia nitrogen concentration: 20 mg/L; DO value: 0 mg/L; COD value: 70 mg/L; and total phosphorus concentration: 1 mg/L; the volume of the water with endogenous pollution was estimated to be 10000 m³, the density of the water with endogenous pollution was 1 kg/m³, and the total weight of the water with endogenous pollution was 10 t.

The specific processing steps are as follows.

(1) Add water to suspend phoslock to obtain wet dosing phoslock, where the solid-liquid ratio of the phoslock to water in the wet dosing phoslock is 0.8 g/mL (the solid-liquid ratios of 0.85 mg/mL, 0.90 mg/mL and 0.95 mg/mL can also basically achieve the same effect); dry calcium peroxide to obtain dry dosing calcium peroxide; and dry aluminum modified zeolite to obtain dry dosing aluminum modified zeolite; where a method for preparing the aluminum modified zeolite includes: preparing 1 mol/L aluminum sulfate solution and 1 mol/L sodium hydroxide solution respectively, then adding 1 g of solid zeolite into every 10 mL of mixed solution of aluminum sulfate and sodium hydroxide (the ratio of the volume of the aluminum sulfate solution to the sodium hydroxide solution in the mixed solution of aluminum sulfate and sodium hydroxide is 2:1), and then transferring to a water bath at 80° C. for heating and stirring treatment to obtain the aluminum modified zeolite.

(2) Add the wet dosing phoslock and the dry dosing calcium peroxide obtained in step (1) into the surface of the water with endogenous pollution for natural settling, where the adding amount of the wet dosing phoslock is 1 kg of phoslock per 10.5 g $PO_4^{3-}$—P in the water, and the value of the adding amount of the dry dosing calcium peroxide in grams is 0.01% that of the weight of the water with endogenous pollution in kilograms; when the transparency of the water with endogenous pollution is improved by 20% compared with the transparency obtained before wet dosing, evenly add the dry dosing aluminum modified zeolite obtained in step (1), where the value of the adding amount of the dry dosing aluminum modified zeolite in grams is 100 times that of the ammonia nitrogen concentration in milligrams per liter.

(3) Monitor the water quality of the water with endogenous pollution every three days and compare it with the water quality of the water with endogenous pollution in the previous monitoring, and determine the adding amounts for the next time according to the comparison result, where the adding amounts for the next time are controlled by:

when in the monitored water with endogenous pollution, COD exceeds 40 mg/L and the index of ammonia nitrogen and the index of total phosphorus are within the standard limit of ammonia nitrogen and the standard limit of total phosphorus in the Class V water standard in China national standard GB3838-2002 respectively, continuing to add the dry dosing calcium peroxide, where the adding amount of the dry dosing calcium peroxide is 1.5 times that of the dry dosing calcium peroxide in step (2), while the adding amount of the wet dosing phoslock and the adding amount of the dry dosing aluminum modified zeolite are 0.8 time that of the wet dosing phoslock and 0.8 time that of the dry dosing aluminum modified zeolite in step (2), respectively;

when in the monitored water with endogenous pollution, the concentration of total phosphorus exceeds 0.4 mg/L and the index of COD and the index of ammonia nitrogen are within the standard limit of COD and the standard limit of ammonia nitrogen in the Class V water standard in China national standard GB3838-2002 respectively, continuing to add the wet dosing phoslock, where the adding amount of the wet dosing phoslock is 1.5 times that of the wet dosing phoslock in step (2), while the adding amount of the dry dosing calcium peroxide and the adding amount of the dry dosing aluminum modified zeolite are 0.8 time that of the dry dosing calcium peroxide and 0.8 time that of the dry dosing aluminum modified zeolite in step (2), respectively;

when in the monitored water with endogenous pollution, the concentration of total nitrogen exceeds 2 mg/L and the index of COD and the index of total phosphorus are within the standard limit of COD and the standard limit of total phosphorus in the Class V water standard in China national standard GB3838-2002 respectively, continuing to add the dry dosing aluminum modified zeolite, where the adding amount of the dry dosing aluminum modified zeolite is 1.5 times that of the dry dosing aluminum modified zeolite in step (2), while the adding amount of the wet dosing phoslock and the adding amount of the dry dosing calcium peroxide are 0.8 time that of the wet dosing phoslock and 0.8 time that of the dry dosing calcium peroxide in step (2), respectively.

When the water quality situation of the monitored water with endogenous pollution is not the foregoing three situations, implement the step (2).

continuing to monitor the water quality of the water with endogenous pollution until all indexes of the water quality meet the Class V water standard in China national standard GB3838-2002.

Finally, after the foregoing treatment, the ammonia nitrogen concentration, COD value and total phosphorus concentration were reduced to 0.6 mg/L, 6 mg/L and 0.08 mg/L, respectively. In addition, the treatment had an obvious antibacterial effect, improved the quality of sludge of the black and odorous river, and inhibited releasing from sludge pollutant.

Figure 2:
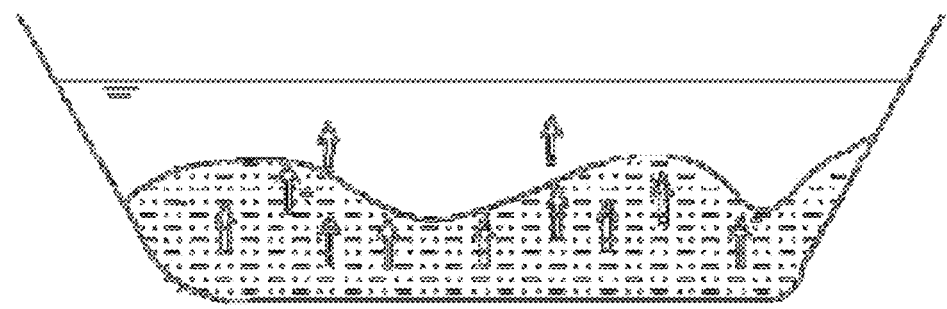
FIG. 2 is a schematic diagram of inhibiting pollutant release after the combined chemicals are added.
Figure 3:
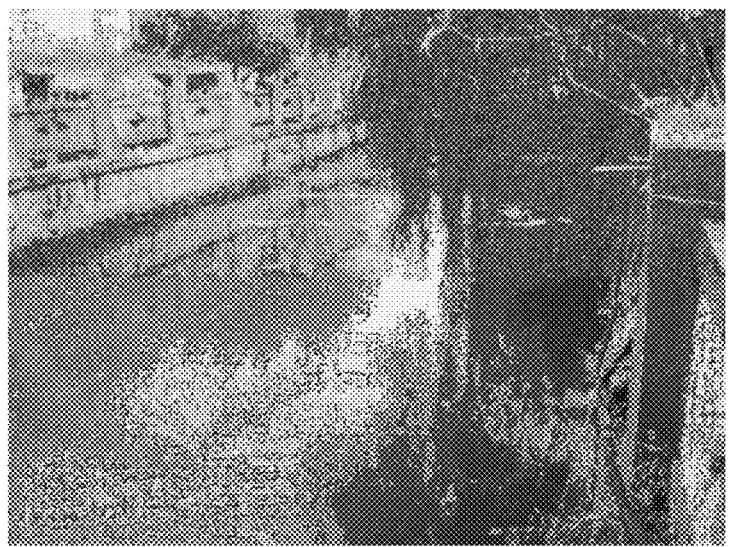
FIG. 3 is a live view of a site situation before treatment.
Figure 4:
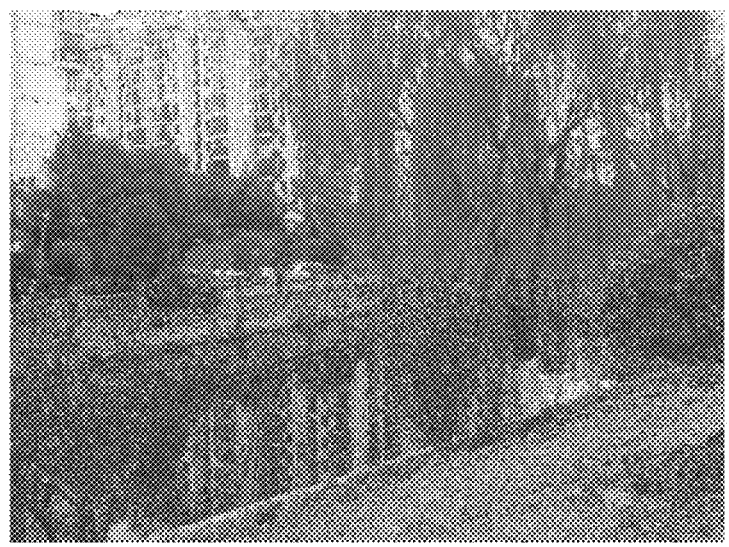
FIG. 4 is a live view of a site situation after treatment.

It can be seen that the endogenous pollution release process of the sludge of the black and odorous river has been changed from FIG. 1 and FIG. 3 to FIG. 2 and FIG. 4 respectively (FIG. 1 is a schematic diagram of FIG. 2, and FIG. 3 is a schematic diagram of FIG. 4). From FIG. 1 and FIG. 2, it can be seen that the chemicals form a barrier on the sludge after the treatment by the method to slow down the endogenous pollution release of the sludge; in addition, it can be seen from FIG. 3 and FIG. 4 that the black and odorous river can be effectively improved after being treated by the method, and there are no organic pollutants floating on the surface of the river, thus improving the anaerobic environment of the water and inhibiting the release of endogenous pollutants.

Embodiment 2

Water samples of an eutrophic lake were collected from a city in Jiangsu, and through laboratory analysis, it was found that the water quality situation of the water samples of the eutrophic lake was as follows: ammonia nitrogen concentration: 30 mg/L; DO value: 10 mg/L; COD value: 70 mg/L; and total phosphorus concentration: 2 mg/L; the volume of the water with endogenous pollution was estimated to be 100000 $m^3$, the density of the water with endogenous pollution was 1.1 $kg/m^3$, and the total weight of the water with endogenous pollution was 110 t.

The specific processing steps are as follows.

(1) Add water to suspend phoslock to obtain wet dosing phoslock, where the solid-liquid ratio of the phoslock to water in the wet dosing phoslock is 1.2 g/mL (the solid-liquid ratios of 1.05 mg/mL, 1.10 mg/mL and 1.15 mg/mL can also basically achieve the same effect); dry calcium peroxide to obtain dry dosing calcium peroxide; and dry aluminum modified zeolite to obtain dry dosing aluminum modified zeolite; where a method for preparing the aluminum modified zeolite includes: preparing 1 mol/L aluminum sulfate solution and 1 mol/L sodium hydroxide solution respectively, then adding 1 g of solid zeolite into every 10 mL of mixed solution of aluminum sulfate and sodium hydroxide (the ratio of the volume of the aluminum sulfate solution to the sodium hydroxide solution in the mixed solution of aluminum sulfate and sodium hydroxide is 1:1), and then transferring to a water bath at 80° C. for heating and stirring treatment to obtain the aluminum modified zeolite.

(2) Add the wet dosing phoslock and the dry dosing calcium peroxide obtained in step (1) into the surface of the water with endogenous pollution for natural settling, where the adding amount of the wet dosing phoslock is 1 kg of phoslock per 10.5 g $PO_4^{3-}$—P in the water, and the value of the adding amount of the dry dosing calcium peroxide in grams is 0.01% that of the weight of the water with endogenous pollution in kilograms; when the transparency of the water with endogenous pollution is improved by 30% compared with the transparency obtained before wet dosing, evenly add the dry dosing aluminum modified zeolite obtained in step (1), where the value of the adding amount of the dry dosing aluminum modified zeolite in grams is 100 times that of the ammonia nitrogen concentration in milligrams per liter.

(3) Monitor the water quality of the water with endogenous pollution every three days and compare it with the water quality of the water with endogenous pollution in the previous monitoring, and determine the adding amounts for the next time according to the comparison result, where the adding amounts for the next time are controlled by:

when in the monitored water with endogenous pollution, COD exceeds 40 mg/L and the index of ammonia nitrogen and the index of total phosphorus are within the standard limit of ammonia nitrogen and the standard limit of total phosphorus in the Class V water standard in China national standard GB3838-2002 respectively, continuing to add the dry dosing calcium peroxide, where the adding amount of the dry dosing calcium peroxide is 1.5 times that of the dry dosing calcium peroxide in step (2), while the adding amount of the wet dosing phoslock and the adding amount of the dry dosing aluminum modified zeolite are 0.8 time that of the wet dosing phoslock and 0.8 time that of the dry dosing aluminum modified zeolite in step (2), respectively;

when in the monitored water with endogenous pollution, the concentration of total phosphorus exceeds 0.4 mg/L and the index of COD and the index of ammonia nitrogen are within the standard limit of COD and the standard limit of ammonia nitrogen in the Class V water standard in China national standard GB3838-2002 respectively, continuing to add the wet dosing phoslock, where the adding amount of the wet dosing phoslock is 1.5 times that of the wet dosing phoslock in step (2), while the adding amount of the dry dosing calcium peroxide and the adding amount of the dry dosing aluminum modified zeolite are 0.8 time that of the dry dosing calcium peroxide and 0.8 time that of the dry dosing aluminum modified zeolite in step (2), respectively;

when in the monitored water with endogenous pollution, the concentration of total nitrogen exceeds 2 mg/L and the index of COD and the index of total phosphorus are within the standard limit of COD and the standard limit of total phosphorus in the Class V water standard in China national standard GB3838-2002 respectively, continuing to add the dry dosing aluminum modified zeolite, where the adding amount of the dry dosing aluminum modified zeolite is 1.5 times that of the dry dosing aluminum modified zeolite in step (2), while the adding amount of the wet dosing phoslock and the adding amount of the dry dosing calcium peroxide are 0.8 time that of the wet dosing phoslock and 0.8 time that of the dry dosing calcium peroxide in step (2), respectively.

When the water quality situation of the monitored water with endogenous pollution is not the foregoing three situations, implement the method of step (2).

continuing to monitor the water quality of the water with endogenous pollution until all indexes of the water quality meet the Class V water standard in China national standard GB3838-2002.

Finally, after the foregoing treatment, the DO value, the ammonia nitrogen concentration, COD value and total phosphorus concentration were reduced to 7 mg/L, 1 mg/L, 5 mg/L and 0.08 mg/L, respectively. In addition, the treatment had an obvious antibacterial effect, improved the quality of sludge of the eutrophic lake, and inhibited releasing from sludge pollutant.

Embodiment 3

Water samples of a river subjected to algal bloom were collected from a city in Jiangsu, and through laboratory analysis, it was found that the water quality situation of the water samples of the river subjected to algal bloom was as follows: ammonia nitrogen concentration: 25 mg/L; DO value: 10 mg/L; COD value: 80 mg/L; and total phosphorus concentration: 2 mg/L; the volume of the water with endogenous pollution was estimated to be 100000 $m^3$, the density of the water with endogenous pollution was 1.1 $kg/m^3$, and the total weight of the water with endogenous pollution was 110 t.

The specific processing steps are as follows.

(1) Add water to suspend phoslock to obtain wet dosing phoslock, where the solid-liquid ratio of the phoslock to water in the wet dosing phoslock is 1.0 g/mL (the solid-liquid ratios of 0.98 mg/mL, 1.01 mg/mL and 1.03 mg/mL can also basically achieve the same effect); dry calcium peroxide to obtain dry dosing calcium peroxide; and dry aluminum modified zeolite to obtain dry dosing aluminum modified zeolite; where a method for preparing the aluminum modified zeolite includes: preparing 1 mol/L aluminum sulfate solution and 1 mol/L sodium hydroxide solution respectively, then adding 1 g of solid zeolite into every 10 mL of mixed solution of aluminum sulfate and sodium hydroxide (the ratio of the volume of the aluminum sulfate solution to the sodium hydroxide solution in the mixed solution of aluminum sulfate and sodium hydroxide is 1:1), and then transferring to a water bath at 80° C. for heating and stirring treatment to obtain the aluminum modified zeolite.

(2) Add the wet dosing phoslock and the dry dosing calcium peroxide obtained in step (1) into the surface of the water with endogenous pollution for natural settling, where the adding amount of the wet dosing phoslock is 1 kg of phoslock per 10.5 g $PO_4^{3-}$—P in the water, and the value of the adding amount of the dry dosing calcium peroxide in grams is 0.01% that of the weight of the water with endogenous pollution in kilograms; when the transparency of the water with endogenous pollution is improved by 30% compared with the transparency obtained before wet dosing, evenly add the dry dosing aluminum modified zeolite obtained in step (1), where the value of the adding amount of the dry dosing aluminum modified zeolite in grams is 100 times that of the ammonia nitrogen concentration in milligrams per liter.

(3) Monitor the water quality of the water with endogenous pollution every three days and compare it with the water quality of the water with endogenous pollution in the previous monitoring, and determine the adding amounts for the next time according to the comparison result, where the adding amounts for the next time are controlled by:

when in the monitored water with endogenous pollution, COD exceeds 40 mg/L and the index of ammonia nitrogen and the index of total phosphorus are within the standard limit of ammonia nitrogen and the standard limit of total phosphorus in the Class V water standard in China national standard GB3838-2002 respectively, continuing to add the dry dosing calcium peroxide, where the adding amount of the dry dosing calcium peroxide is 1.5 times that of the dry dosing calcium peroxide in step (2), while the adding amount of the wet dosing phoslock and the adding amount of the dry dosing aluminum modified zeolite are 0.8 time that of the wet dosing phoslock and 0.8 time that of the dry dosing aluminum modified zeolite in step (2), respectively;

when in the monitored water with endogenous pollution, the concentration of total phosphorus exceeds 0.4 mg/L and the index of COD and the index of ammonia nitrogen are within the standard limit of COD and the standard limit of ammonia nitrogen in the Class V water standard in China national standard GB3838-2002 respectively, continuing to add the wet dosing phoslock, where the adding amount of the wet dosing phoslock is 1.5 times that of the wet dosing phoslock in step (2), while the adding amount of the dry dosing calcium peroxide and the adding amount of the dry dosing aluminum modified zeolite are 0.8 time that of the dry dosing calcium peroxide and 0.8 time that of the dry dosing aluminum modified zeolite in step (2), respectively;

when in the monitored water with endogenous pollution, the concentration of total nitrogen exceeds 2 mg/L and the index of COD and the index of total phosphorus are within the standard limit of COD and the standard limit of total phosphorus in the Class V water standard in China national standard GB3838-2002 respectively, continuing to add the dry dosing aluminum modified zeolite, where the adding amount of the dry dosing aluminum modified zeolite is 1.5 times that of the dry dosing aluminum modified zeolite in step (2), while the adding amount of the wet dosing phoslock and the adding amount of the dry dosing calcium peroxide are 0.8 time that of the wet dosing phoslock and 0.8 time that of the dry dosing calcium peroxide in step (2), respectively.

When the water quality situation of the monitored water with endogenous pollution is not the foregoing three situations, implement the method of step (2).

continuing to monitor the water quality of the water with endogenous pollution until all indexes of the water quality meet the Class V water standard in China national standard GB3838-2002.

Finally, after the foregoing treatment, the DO value, the ammonia nitrogen concentration, COD value and total phosphorus concentration were reduced to 8 mg/L, 0.6 mg/L, 4 mg/L and 0.06 mg/L, respectively. In addition, the treatment had an obvious antibacterial effect, improved the quality of sludge of the river subjected to algal bloom, and inhibited releasing from sludge pollutant.

What is claimed is:

1. An in situ treatment method for endogenous pollution in water, including the following steps: (1) monitoring polluted water for $PO_4^{3-}$-P (orthophosphate as phosphorus) and ammonia nitrogen concentration; (2) adding water to suspend Lanthanum modified bentonite clay to obtain wet dosing Lanthanum modified bentonite clay; drying calcium peroxide to obtain dry dosing calcium peroxide; drying aluminum modified zeolite to prepare dry dosing aluminum modified zeolite; (3) adding the wet dosing Lanthanum modified bentonite clay and the dry dosing calcium peroxide obtained in step (2) to a surface of the polluted water for natural settling, wherein the adding amount of the wet dosing Lanthanum modified bentonite clay is 1 kg of Lanthanum modified bentonite clay per 10.5 g $PO_4^{3-}$-P in the polluted water, and the value of the adding amount of the dry dosing calcium peroxide in grams is 0.01% that of the weight of the polluted water in kilograms; when the transparency of the polluted water is improved by 20%-30% compared with the transparency before wet dosing, evenly adding the dry dosing aluminum modified zeolite obtained in step (2), wherein the value of the adding amount of the dry dosing aluminum modified zeolite in grams is 100 times that of the monitored ammonia nitrogen concentration in milligrams per liter; and (4) monitoring the water quality of the polluted water every three days and comparing it with the water quality of the polluted water in a previous monitoring, and determining the adding amounts for a subsequent treatment according to a comparison result, wherein the adding amounts for the subsequent treatment are controlled by: when all indexes of the water quality of the monitored polluted water do not meet Class V water standard in China national standard GB3838-2002, implementing step (3); and continuing to monitor the water quality of the polluted water until all indexes of the water quality meet the Class V water standard in China national standard GB3838-2002.

2. The in situ treatment method for endogenous pollution in water according to claim 1, wherein a solid-liquid ratio of the Lanthanum modified bentonite clay to water in the wet dosing Lanthanum modified bentonite clay is 0.8-1.2 g/mL.

3. The in situ treatment method for endogenous pollution in water according to claim 2, wherein the solid-liquid ratio of the Lanthanum modified bentonite clay to water in the wet dosing Lanthanum modified bentonite clay is 1.0 g/mL.

4. The in situ treatment method for endogenous pollution in water according to claim 2, wherein the adding amounts for the subsequent treatment in step (4) are further controlled by: when in the monitored polluted water, COD exceeds 40 mg/L, increasing the adding amount of the dry dosing calcium peroxide to 1.5 times in step (3), while decreasing the adding amount of the wet dosing Lanthanum modified bentonite clay and the adding amount of the dry dosing aluminum modified zeolite to 0.8 times that of the wet dosing Lanthanum modified bentonite clay and 0.8 times that of the dry dosing aluminum modified zeolite in step (3), respectively.

5. The in situ treatment method for endogenous pollution in water according to claim 1, wherein the adding amounts for the subsequent treatment in step (4) are further controlled by: when in the monitored polluted water, a total phosphorus concentration exceeds 0.4 mg/L, increasing the adding amount of the wet dosing Lanthanum modified bentonite clay to 1.5 times in step (3), while decreasing the adding amount of the dry dosing calcium peroxide and the adding amount of the dry dosing aluminum modified zeolite to 0.8 times that of the dry dosing calcium peroxide and 0.8 times that of the dry dosing aluminum modified zeolite in step (3), respectively.

6. The in situ treatment method for endogenous pollution in water according to claim 5, wherein the adding amounts for the subsequent treatment in step (4) are further controlled by: when in the monitored polluted water, a total nitrogen concentration exceeds 2 mg/L, increasing the adding amount of the dry dosing aluminum modified zeolite to 1.5 times in step (3), while decreasing the adding amount of the wet dosing Lanthanum modified bentonite clay and the adding amount of the dry dosing calcium peroxide to 0.8 times that of the wet dosing Lanthanum modified bentonite clay and 0.8 times that of the dry dosing calcium peroxide in step (3), respectively.

7. The in situ treatment method for endogenous pollution in water according to claim 1, wherein a method for preparing the dry dosing aluminum modified zeolite in step (2) comprises: preparing 1 mol/L aluminum sulfate solution and 1 mol/L sodium hydroxide solution respectively, adding 1 g of solid zeolite to every 10 mL of mixed solution of the aluminum sulfate solution and the sodium hydroxide solution, and then transferring to a water bath at 80° C. for heating and stirring treatment to obtain the dry dosing aluminum modified zeolite.

8. The in situ treatment method for endogenous pollution in water according to claim 7, wherein the ratio of the volume of the aluminum sulfate solution to the volume of the sodium hydroxide solution in the mixed solution of the aluminum sulfate solution and the sodium hydroxide solution is 1:1.

9. The in situ treatment method for endogenous pollution in water according to claim 3, wherein the adding amounts for the subsequent treatment in step (4) are further controlled by: when in the monitored polluted water, COD exceeds 40 mg/L, increasing the adding amount of the dry dosing calcium peroxide to 1.5 times in step (3), while decreasing the adding amount of the wet dosing Lanthanum modified bentonite clay and the adding amount of the dry dosing aluminum modified zeolite to 0.8 times that of the wet dosing Lanthanum modified bentonite clay and 0.8 times that of the dry dosing aluminum modified zeolite in step (3), respectively.

10. The in situ treatment method for endogenous pollution in water according to claim 2, wherein a method for preparing the dry dosing aluminum modified zeolite in step (2) comprises: preparing 1 mol/L aluminum sulfate solution and 1 mol/L sodium hydroxide solution respectively, adding 1 g of solid zeolite to every 10 mL of mixed solution of the aluminum sulfate solution and the sodium hydroxide solution, and then transferring to a water bath at 80° C. for heating and stirring treatment to obtain the dry dosing aluminum modified zeolite.

11. The in situ treatment method for endogenous pollution in water according to claim 3, wherein a method for preparing the dry dosing aluminum modified zeolite in step (2) comprises: preparing 1 mol/L aluminum sulfate solution and 1 mol/L sodium hydroxide solution respectively, adding 1 g of solid zeolite to every 10 mL of mixed solution of the aluminum sulfate solution and the sodium hydroxide solution, and then transferring to a water bath at 80° C. for heating and stirring treatment to obtain the dry dosing aluminum modified zeolite.

\* \* \* \* \*